United States Patent
O'Donnell et al.

(10) Patent No.: US 8,010,175 B2
(45) Date of Patent: Aug. 30, 2011

(54) PATIENT-SPECIFIC CORONARY TERRITORY MAPPING

(75) Inventors: Thomas O'Donnell, New York, NY (US); James P. Williams, Princeton Junction, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1881 days.

(21) Appl. No.: 11/120,876

(22) Filed: May 3, 2005

(65) Prior Publication Data

US 2005/0272992 A1 Dec. 8, 2005

Related U.S. Application Data

(60) Provisional application No. 60/568,330, filed on May 5, 2004.

(51) Int. Cl.
 A61B 5/04 (2006.01)
 A61B 5/05 (2006.01)
(52) U.S. Cl. ........................................ 600/407
(58) Field of Classification Search .................. 600/374, 600/407, 423–425, 447, 450, 508–509; 382/131, 382/154, 294, 128, 254, 256, 276, 285, 298; 345/420, 581–588, 629–630, 653–654; 703/11
See application file for complete search history.

(56) References Cited

U.S. PATENT DOCUMENTS

| | | | | |
|---|---|---|---|---|
| 4,878,115 A * | 10/1989 | Elion | ............................ | 378/98.5 |
| 5,151,856 A * | 9/1992 | Halmann et al. | ............... | 600/508 |
| 5,457,754 A * | 10/1995 | Han et al. | ....................... | 382/128 |
| 5,487,391 A * | 1/1996 | Panescu | ......................... | 600/512 |
| 5,602,891 A * | 2/1997 | Pearlman | ........................ | 378/62 |
| 5,662,108 A * | 9/1997 | Budd et al. | ..................... | 600/374 |
| 5,846,198 A * | 12/1998 | Killmann | ....................... | 600/424 |
| 5,983,126 A * | 11/1999 | Wittkampf | ..................... | 600/509 |
| 5,997,883 A * | 12/1999 | Epstein et al. | ................. | 324/306 |
| 6,047,080 A * | 4/2000 | Chen et al. | ..................... | 382/128 |
| 6,106,466 A * | 8/2000 | Sheehan et al. | ................ | 600/443 |
| 6,301,496 B1 * | 10/2001 | Reisfeld | ......................... | 600/407 |
| 6,301,498 B1 * | 10/2001 | Greenberg et al. | ............ | 600/425 |
| 6,490,474 B1 * | 12/2002 | Willis et al. | .................... | 600/424 |

(Continued)

FOREIGN PATENT DOCUMENTS

DE 10311319 A1 11/2003

(Continued)

OTHER PUBLICATIONS

Chen, S. et al "Modeling Human Heart Based on Cardiac Tomography", Proc. SPIE vol. 1778, p. 14-18, Abstract.*

*Primary Examiner* — Francis Jaworski
(74) *Attorney, Agent, or Firm* — Donald B. Paschburg; F. Chau & Associates, LLC

(57) ABSTRACT

A system and method for patient-specific coronary territory mapping are provided, the system including an adapter unit for receiving three-dimensional ("3D") image data, a modeling unit in signal communication with the adapter unit for fitting a geometric model to the received data and segmenting coronary vessels from the received data, and a mapping unit in signal communication with the modeling unit for mapping the segmented vessels to the surface of the model; and the method including receiving 3D image data, fitting a geometric model to the received data, segmenting coronary vessels from the received data, and mapping the segmented vessels to the surface of the model.

28 Claims, 4 Drawing Sheets

U.S. PATENT DOCUMENTS

| | | | |
|---|---|---|---|
| 6,563,941 B1 * | 5/2003 | O'Donnell et al. | 382/131 |
| 6,574,492 B1 * | 6/2003 | Ben-Haim et al. | 600/374 |
| 6,600,948 B2 * | 7/2003 | Ben-Haim et al. | 600/512 |
| 6,892,091 B1 * | 5/2005 | Ben-Haim et al. | 600/509 |
| 6,896,657 B2 * | 5/2005 | Willis | 600/437 |
| 6,970,733 B2 * | 11/2005 | Willis et al. | 600/424 |
| 7,189,208 B1 * | 3/2007 | Beatty et al. | 600/587 |
| 7,191,110 B1 * | 3/2007 | Charbel et al. | 703/11 |
| 7,260,252 B2 * | 8/2007 | Fujisawa | 382/131 |
| 7,447,535 B2 * | 11/2008 | Lavi | 600/407 |
| 7,526,112 B2 * | 4/2009 | Murphy et al. | 382/128 |
| 7,545,966 B2 * | 6/2009 | Lewin et al. | 382/128 |
| 2001/0044585 A1 * | 11/2001 | Dupree et al. | 600/509 |
| 2002/0072670 A1 * | 6/2002 | Chenal et al. | 600/449 |
| 2002/0120192 A1 * | 8/2002 | Nolte et al. | 600/424 |

FOREIGN PATENT DOCUMENTS

WO        WO 0101859 A1     1/2001

* cited by examiner

PATIENT-SPECIFIC CORONARY TERRITORY MAPPING

CROSS-REFERENCE TO RELATED APPLICATION

This application claims the benefit of U.S. Provisional Application Ser. No. 60/568,330, filed May 5, 2004 and entitled "Patient-Specific Coronary Territory Maps", which is incorporated herein by reference in its entirety.

BACKGROUND

Coronary territory maps associate coronary arteries with the myocardial regions to which they provide irrigation. Such maps may be used to determine which vessels should be targeted for intervention when certain functional abnormalities are detected in the tissues of the Left Ventricle ("LV"). The functional abnormalities might include infarctions, for example.

As shown in FIG. 1, a generic American Heart Association ("AHA") coronary territory map is indicated generally by the reference numeral 10. This mapping 10 of LV territories to coronary arteries is as prescribed by AHA. The first region 12 is fed by the Left Anterior Descending Artery ("LAD") 22. The second region 14 is fed by the Right Coronary Artery ("RCA") 24. The third region 16 is fed by the Left Circumflex Artery ("LCX") 26.

The AHA published a Scientific Statement in 2002 that standardized the LV coronary territories. Unfortunately, the AHA map 10, while powerful, is not patient specific. Rather, it is an average that fails to recognize the variability between subjects. The apical region of the LV, in particular, is known to exhibit significant variability among subjects. Other variations, for example, may be due to anomalous anatomical branching or the creation of collateral vascular in compensation for a stenosis.

Generally, the success of imaging techniques such as Magnetic Resonance Imaging ("MRI") and Positron Emission Tomography ("PET"), when used as tools for aiding revascularization planning, depends upon the accuracy of the associations between regional myocardial function or perfusion or viability and the patient's coronary anatomy. Typically, generic distribution models are used to make this association. These models are based on empirical data derived from groups of patients, from which many individual patients are known to deviate.

As an example, a recent study assessed the accuracy of a generic 17-segment LV model relating coronary anatomy with myocardial regions using monoplane coronary angiography in 135 patients. Although the distribution model showed good agreement with actual coronary anatomy on average, there was discordance in more than four segments in 27 patients (20%), and discordance in more than five segments in 13 patients (10%), eight of whom had left dominant coronary distributions where the model assumes right dominance. The clinical impact of such errors was not addressed by the study.

In addition, the present inventors have performed a study, which used co-registered MRI and Multidetector Computed Tomography ("MDCT") images to assess the correspondence of 26 individual patients to a generic coronary distribution model. In these patients, 22 patients, or 85%, were found to be discordant in at least one segment. Overall, 76 myocardial segments out of 442 total segments, or 17% of the segments, differed from their assignment by the generic model.

Therefore, although generic distribution models can accurately represent coronary anatomy on average, they are unable to account for the potentially significant variability in coronary anatomy that can exist between different individuals.

SUMMARY

These and other drawbacks and disadvantages of the prior art are addressed by a system and method for patient-specific coronary territory mapping.

An exemplary system for patient-specific coronary territory mapping includes an adapter unit for receiving three-dimensional ("3D") image data, a modeling unit in signal communication with the adapter unit for fitting a geometric model to the received data and segmenting coronary vessels from the received data, and a mapping unit in signal communication with the modeling unit for mapping the segmented vessels to the surface of the model.

A corresponding exemplary method for patient-specific coronary territory mapping includes receiving 3D image data, fitting a geometric model to the received data, segmenting coronary vessels from the received data, and mapping the segmented vessels to the surface of the model.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a system and method for patient-specific coronary territory mapping in accordance with the following exemplary figures, in which.

DETAILED DESCRIPTION OF PREFERRED EMBODIMENTS

The present disclosure describes the development and evaluation of patient-specific coronary distribution maps. Embodiments of the present disclosure include systems and methods for patient-specific coronary territory mapping.

Models relating the coronary arteries to regions of left ventricular myocardia are used routinely to describe the impact and severity of coronary artery disease in conjunction with noninvasive imaging, such as echocardiography, magnetic resonance imaging ("MRI"), and the like. Unfortunately, although generic models can be relatively accurate in a majority of patients, an individual patient's coronary anatomy may have significant deviations.

Thus, embodiments of the present disclosure create patient-specific coronary distribution maps based on noninvasive imaging. Exemplary embodiments provide physicians with a tool that can be used to tailor coronary revascularization to a patient's specific disease presentation.

Figure 1:
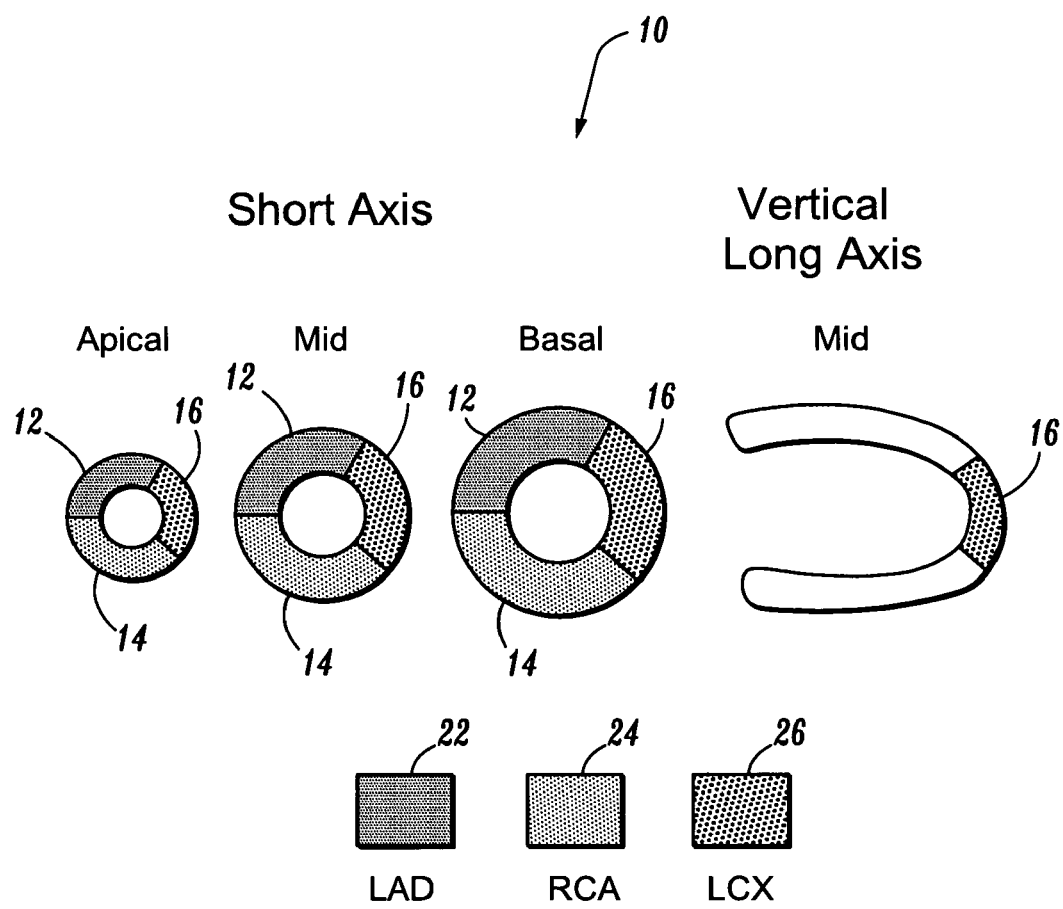
FIG. 1 shows a schematic diagram of a generic American Heart Association ("AHA") coronary territory map.
Figure 2:
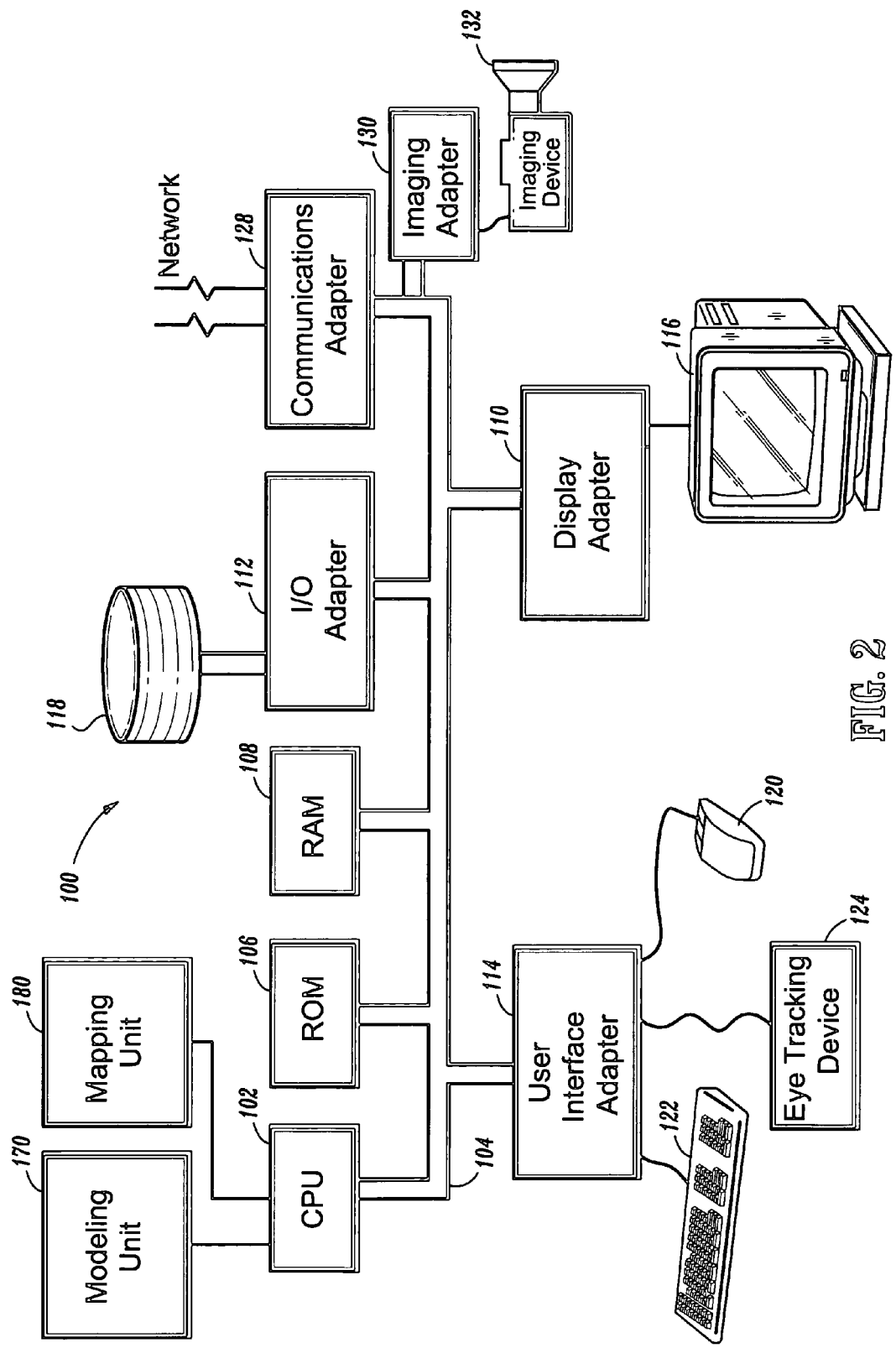
FIG. 2 shows a schematic diagram of a system for patient-specific coronary territory mapping in accordance with an illustrative embodiment of the present disclosure.

As shown in FIG. 2, a system for patient-specific coronary territory mapping, according to an illustrative embodiment of the present disclosure, is indicated generally by the reference numeral 100. The system 100 includes at least one processor or central processing unit (CPU) 102 in signal communication with a system bus 104. A read only memory (ROM) 106, a random access memory (RAM) 108, a display adapter 110, an I/O adapter 112, a user interface adapter 114, a communications adapter 128, and an imaging adapter 130 are also in signal communication with the system bus 104. A display unit 116 is in signal communication with the system bus 104 via the display adapter 110. A disk storage unit 118, such as, for example, a magnetic or optical disk storage unit is in signal communication with the system bus 104 via the I/O adapter 112. A mouse 120, a keyboard 122, and an eye tracking device 124 are in signal communication with the system bus 104 via the user interface adapter 114. An imaging device 132 is in signal communication with the system bus 104 via the imaging adapter 130.

A modeling unit 170 and a mapping unit 180 are also included in the system 100 and in signal communication with the CPU 102 and the system bus 104. While the modeling unit 170 and the mapping unit 180 are illustrated as coupled to the at least one processor or CPU 102, these components are preferably embodied in computer program code stored in at least one of the memories 106, 108 and 118, wherein the computer program code is executed by the CPU 102.

Figure 3:
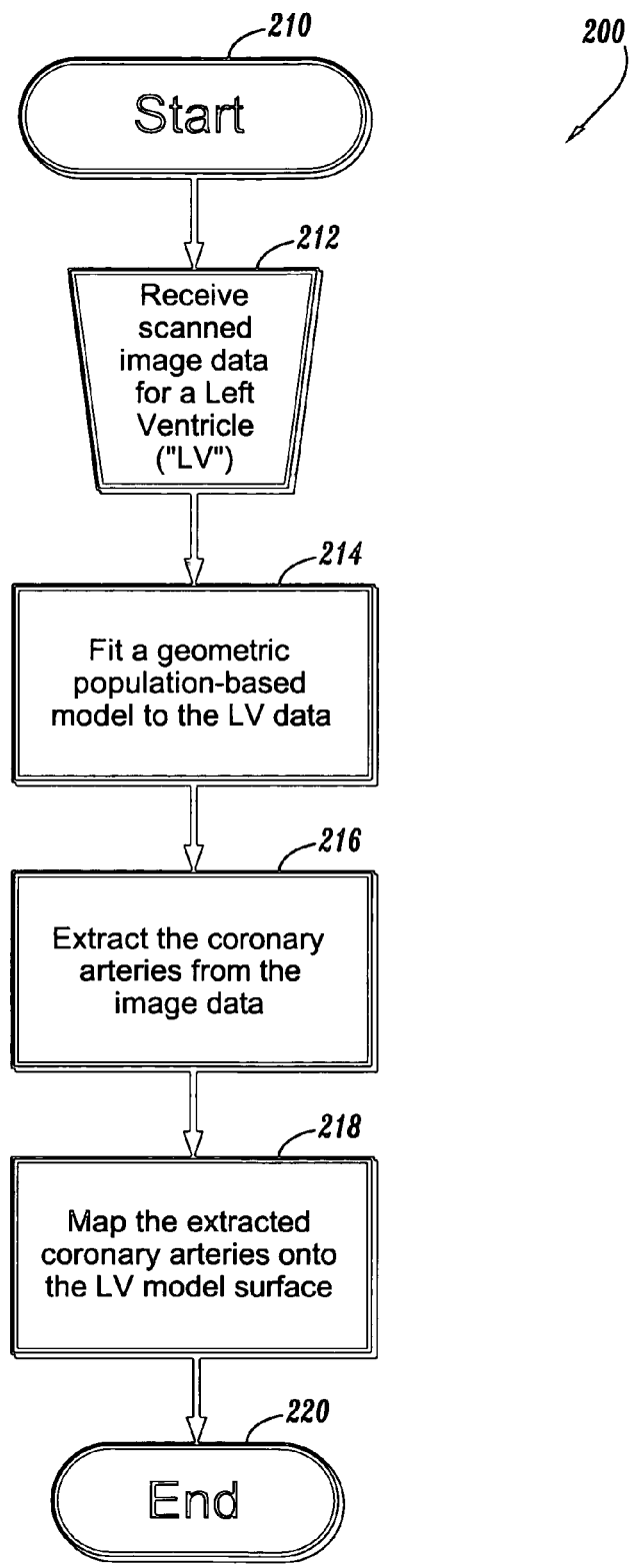
FIG. 3 shows a flow diagram of a method for patient-specific coronary territory mapping in accordance with an illustrative embodiment of the present disclosure.

Turning to FIG. 3, a method for patient-specific coronary territory mapping in accordance with an illustrative embodiment of the present disclosure is indicated generally by the reference numeral 200. The method 200 includes a start block 210 that passes control to an input block 212. The input block 212 receives scanned image data for a Left Ventricle ("LV"), such as a Multidetector Computed Tomography ("MDCT") data set, and passes control to a function block 214. The function block 214 fits a geometric population-based model to the LV data, and passes control to a function block 216. The function block 216, in turn, extracts the coronary arteries from the image data, and passes control to a function block 218. The function block 218 maps the extracted coronaries onto the LV model surface, and passes control to an end block 220.

In alternate method embodiments, the geometric model fitted to the LV data need not be based on population, but may be based on finite element analysis ("FEA"), nonuniform rational B-splines ("NURB"), or other like means. In addition, another alternate embodiment applies the present technique to X-ray Angioraphy data, where it is possible to see the coronary vessels but not the shape of the LV. In this case, a default LV model is received and its surface is divided based on the coronary structures.

Figure 4:
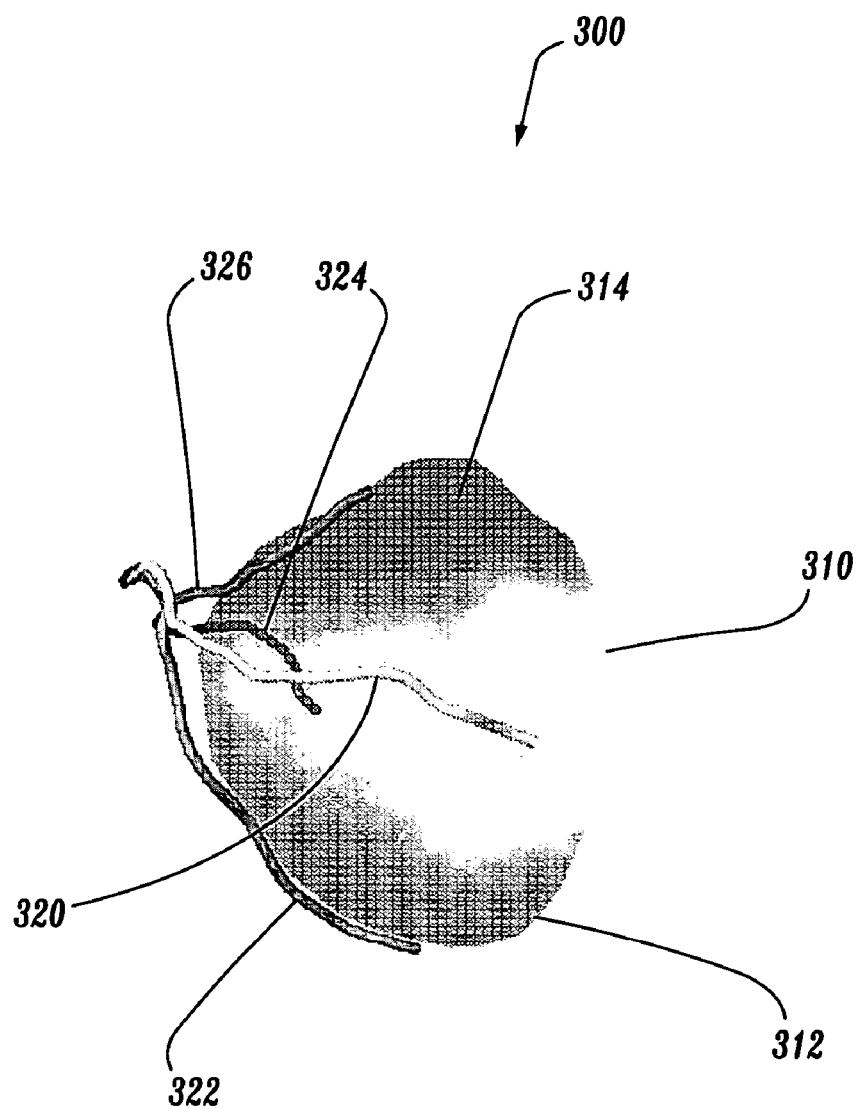
FIG. 4 shows a schematic diagram of a patient-specific coronary territory map in accordance with an illustrative embodiment of the present disclosure.

Turning now to FIG. 4, an exemplary left ventricle ("LV") surface model is indicated generally by the reference numeral 300. The surface model 300 is labeled via competitive region growing, resulting in a patient-specific coronary map. The LV surface model is divided into three regions or territories, which are based on their proximities to the segmented coronary arteries.

The Circumflex ("CFX") region 310 is fed by the CFX artery 320. The Left Anterior Descending ("LAD") region 312 is fed by the LAD artery 322. The Left Anterior Descending Diagonal ("LADD") region 314 is fed by the LADD artery 324. The Right Coronary Artery ("RCA") 326 is also shown. In addition, other arteries may be included, such as the Left Main ("LM") artery, for example. In operation, an exemplary embodiment of the present disclosure uses noninvasive tomographic imaging, such as Multidetector Computed Tomography ("MDCT"), for example, to produce a three-dimensional ("3D") mapping that identifies, for any point on the myocardium, the coronary artery most likely responsible for its perfusion. This mapping or association is preferably a function of the proximity of each vessel along the epicardial surface, tempered by prior knowledge of general perfusion patterns in myocardia. Because the resulting map is 3D, it may be sampled to create a two-dimensional ("2D") map for any arbitrary image orientation. Thus, this embodiment is not limited to traditional short-axis and/or long-axis views. In addition, the map need not be confined to expressing territories in terms of three coronary "systems", but relates regions of myocardium to actual arteries, including branch vessels. Further, the arteries can be further subdivided into segments before and after an occlusion, for example. Maps may be validated using x-ray coronary angiography, for example.

An individual patient's coronary anatomy often deviates from generic LV models. Therefore, patient-specific 3D coronary distribution mappings may be created by mapping manually segmented coronary arteries, including primary and branch vessels, onto a surface model of the individual's LV. MDCT images may be chosen for this application because they enable precise delineation of both the LV myocardium and epicardial coronary arteries.

Referring back to FIG. 3, maps may be created in steps by fitting a geometric, population-based model to the LV in an MDCT data set; extracting the coronary arteries from MDCT images; and mapping the extracted coronaries onto the LV model surface. The mapping step may be shown in a Voronoi diagram on the epicardial surface, dividing the surface based on proximity to the source arteries. Such a proximity-based assignment has a sound basis.

Segmented vessels are projected onto the epicardial surface of the LV model. The multiple projections are expanded simultaneously over the surface to form the perfusion regions. Because the resulting 3D coronary distribution map is based on tomographic images, it can be resampled for display in any arbitrary image orientation.

Segmented coronary arteries are projected onto the epicardial surface of the MDCT-derived LV model. This is performed by discretizing the vessel path and finding, for each point along the path, the closest point on the epicardial surface. The point on the surface will maintain the label of the vessel. Portions of vessels farther than about 5 mm from the LV epicardial surface will be excluded from this processing in order to remove segments not responsible for irrigating the LV, such as the proximal RCA as it wraps around the right ventricle ("RV"), for example.

The epicardial surface of the model will then have select points labeled as corresponding to one of the coronary vessels. This labeling is expanded to the entire surface such that each point on the surface is associated with the vessel most likely responsible for its irrigation. This expansion may be performed by random walk simulation, optimized coronary tree models, or competitive region growing. In competitive region growing, each group of points expands simultaneously over the surface, halting when the front of one meets the front of another. Regions not directly perfused, such as the mitrial valve, for example, may be excluded.

Thus, exemplary embodiments of the present disclosure create patient-specific coronary territory maps that can help clinicians to determine the appropriate associations for any particular individual. While the approach is based on the assumption that a region is irrigated by the closest vessel, other information may be included for consideration, such as historical data, temperature, pressure, volume and/or pulse timing data, for examples.

In some embodiments, prior knowledge of the anatomy may be brought to bear. For example, the septum has no close primary vessels feeding it, but it is known to be supplied by the RCA. Thus, one embodiment incorporates such apriori knowledge in a final procedure, where proximity alone might not arrive at a correct solution.

A Voronoi diagram may be computed on the epicardial surface of the LV such that each point on the surface is labeled as being associated with the closest vessel as computed on that topology. The epicardial surface of the LV is modeled to determine the paths of the coronary arteries. For each artery, the closest points on the surface are computed and labeled as being associated with the corresponding coronary. Competitive region growing is then invoked to expand each of the labeled sets of points until the entire surface is labeled as being associated with one of the arteries.

The result is a true 3D coronary territory map, which may be reformatted in an arbitrary image plane. This is in contrast to the standard AHA mapping which shows only four canonical cross-sections.

Another embodiment of the present disclosure makes it possible to compute an average AHA-like territory map additionally having confidence values associated with the region assignments. These confidence values may be compiled over a large population and could provide a more statistical approach to coronary assignment in the absence of visible coronaries.

A further embodiment of the present disclosure may fuse patient-specific coronary territory mapping with cardiac function mapping to provide additional information for clinicians.

Yet another embodiment of the present disclosure provides for patient-specific maps describing myocardial viability. Parametric maps describing myocardial viability and function could reduce analysis time by giving physicians a global view of the extent of cardiovascular disease, especially when used in conjunction with patient-specific coronary distribution maps.

Therefore, this embodiment creates 3D maps that visually encode relevant cardiac parameters, such myocardial viability by MRI or PET, or wall thickness by MDCT or MRI, for examples. These maps conform to the LV shape, and consolidate information from tomographic images into a surface display for ease of viewing, thus allowing clinicians to quickly identify regions which merit interest. Like the coronary distribution maps, the 3D maps may be arbitrarily reformatted to any orientation. Accuracy of the resulting maps may be assessed by experienced cardiovascular imagers with access to the raw images from which the maps are derived.

It is to be understood that the teachings of the present disclosure may be implemented in various forms of hardware, software, firmware, special purpose processors, or combinations thereof. Most preferably, the teachings of the present disclosure are implemented as a combination of hardware and software.

Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units (CPU), a random access memory (RAM), and input/output (I/O) interfaces.

The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for patient-specific coronary territory mapping comprising performing the following with a processor:
   receiving three-dimensional ("3D") image data;
   fitting a geometric model to the received data;
   segmenting coronary vessels from the received data;
   mapping the segmented vessels to the surface of the model;
   computing a Voronoi diagram responsive to the mapping on an epicardial surface; and
   dividing the surface based on proximity to the source arteries,
   wherein the model is based on at least one of population and nonuniform rational B-splines ("NURB") and using the patient-specific coronary territory mapping model to determine if medical intervention is needed in the patient.

2. A method as defined in claim 1 wherein the model is based on population, finite element analysis ("FEA"), and nonuniform rational B-splines ("NURB").

3. A method as defined in claim 1, further comprising:
   receiving data indicative of a default left ventricular ("LV") model; and
   dividing the surface of the default LV based on coronary structures.

4. A method as defined in claim 3 wherein the 3D image data is X-ray Angiography data.

5. A method as defined in claim 1 wherein:
   the geometric model is indicative of a left ventricle; and
   the extracted vessels include an anterior artery, a circumflex artery, a coronary artery, and a main artery.

6. A method as defined in claim 1, further comprising labeling the model via competitive region growing to provide a patient-specific coronary map.

7. A method as defined in claim 1, further comprising noninvasive tomographic imaging to provide the image data.

8. A method as defined in claim 1 wherein the mapping identifies the coronary artery most responsible for the perfusion of any point on a myocardium.

9. A method as defined in claim 1 wherein the mapping is a function of the proximity of each vessel along an epicardial surface and prior knowledge of general perfusion patterns in myocardia.

10. A method for patient-specific coronary territory mapping comprising performing the following with a processor:
    receiving three-dimensional ("3D") image data;

fitting a geometric model to the received data;
segmenting coronary vessels from the received data; and
mapping the segmented vessels to the surface of the model,
wherein said mapping is a function of the proximity of each vessel along an epicardial surface and prior knowledge of perfusion patterns in myocardia, and the prior knowledge is indicative of septums that lack a supply from close primary vessels and using the patient-specific coronary territory mapping model to determine if medical intervention is needed in the patient.

11. A method as defined in claim 10, further comprising:
computing a Voronoi diagram responsive to the mapping on an epicardial surface; and
dividing the surface based on proximity to the source arteries,
wherein the model is based on nonuniform rational B-splines ("NURB").

12. A method as defined in claim 1, further comprising:
sampling the resulting 3D mapping to create a two-dimensional ("2D") mapping for any arbitrary image orientation.

13. A method as defined in claim 1 wherein the mapping relates regions of a myocardium to actual arteries, including primary and branch vessels.

14. A method as defined in claim 1, further comprising subdividing the vessels into segments before and after an occlusion.

15. A method as defined in claim 1, wherein the mapping comprises:
projecting segmented vessels onto the epicardial surface of the Left Ventricle ("LV"); and
expanding the multiple projections simultaneously over the surface to form perfusion regions.

16. A method as defined in claim 15 wherein the resulting 3D coronary distribution mapping is based on tomographic images, and the method further comprises resampling the mapping for display in an arbitrary image orientation.

17. A method as defined in claim 15, wherein projecting the segmented vessels comprises discretizing the vessel path and finding the closest point on the epicardial surface for each point along the path.

18. A method as defined in claim 1, further comprising labeling the entire surface of the model such that each point on the surface is associated with the vessel most likely responsible for its irrigation.

19. A method as defined in claim 1 wherein mapping is indicative of at least one region being irrigated by the closest vessel, the historical probability of at least one region being irrigated by a particular vessel, and a correlation of physical data for at least one particular vessel.

20. A method as defined in claim 1, further comprising fusing the patient-specific coronary territory mapping with cardiac function mapping to provide additional information.

21. A method as defined in claim 1, further comprising providing patient-specific parametric maps indicative of myocardial viability.

22. A method as defined in claim 1, further comprising visually encoding cardiac parameters in accordance with the left ventricular shape to consolidate information from tomographic images into a surface display for ease of viewing.

23. A method for patient-specific coronary territory mapping comprising performing the following with a processor:
receiving three-dimensional ("3D") image data;
fitting a geometric model to the received data;
segmenting coronary vessels from the received data;
mapping the segmented vessels to the surface of the model;
labeling the model via competitive region growing to provide a patient-specific coronary map; and
dividing the surface of the model into at least three territories in accordance with proximities to the segmented vessels,
wherein the model is based on at least one of population and nonuniform rational B-splines ("NURB") and using the patient-specific coronary territory mapping model to determine if medical intervention is needed in the patient.

24. A method for patient-specific coronary territory mapping comprising performing the following with a processor:
receiving three-dimensional ("3D") image data;
fitting a geometric model to the received data;
segmenting coronary vessels from the received data;
mapping the segmented vessels to the surface of the model; and
labeling the entire surface of the model such that each point on the surface is associated with the vessel most likely responsible for irrigation,
wherein the labeling comprises competitive region growing, each group of points during competitive region growing expands simultaneously over the surface and halts when the front of one group meets the front of another group, and the model is based on at least one of population and nonuniform rational B-splines ("NURB") and using the patient-specific coronary territory mapping model to determine if medical intervention is needed in the patient.

25. A method for patient-specific coronary territory mapping comprising performing the following with a processor:
receiving three-dimensional ("3D") image data;
fitting a geometric model to the received data;
segmenting coronary vessels from the received data;
mapping the segmented vessels to the surface of the model; and
computing an average territory map for a large population of subjects, the map including confidence values associated with the region assignments,
wherein the model is based on at least one of population and nonuniform rational B-splines ("NURB") and using the patient-specific coronary territory mapping model to determine if medical intervention is needed in the patient.

26. A method for patient-specific coronary territory mapping comprising performing the following with a processor:
receiving three-dimensional ("3D") image data;
fitting a geometric model to the received data;
segmenting coronary vessels from the received data;
mapping the segmented vessels to the surface of the model; and
labeling the entire surface of the model such that each point on the surface is associated with the vessel most likely responsible for its irrigation,
wherein regions not directly perfused are excluded from labeling, and the model is based on at least one of population and nonuniform rational B-splines ("NURB") and using the patient-specific coronary territory mapping model to determine if medical intervention is needed in the patient.

27. A method for patient-specific coronary territory mapping comprising performing the following with a processor:
receiving three-dimensional ("3D") image data;
fitting a geometric model to the received data;
segmenting coronary vessels from the received data;
mapping the segmented vessels to the surface of the model; and labeling the entire surface of the model such that each point on the surface is associated with the vessel most likely responsible for its irrigation, wherein labeling comprises a random walk simulation, and the model is based on at least one of population and nonuniform rational B-splines ("NURB") and using the patient-specific coronary territory mapping model to determine if medical intervention is needed in the patient.

28. A method for patient-specific coronary territory mapping comprising performing the following with a processor:

receiving three-dimensional ("3D") image data;
fitting a geometric model to the received data;
segmenting coronary vessels from the received data;
mapping the segmented vessels to the surface of the model;
projecting the segmented vessels onto the epicardial surface of a left ventricle by discretizing the vessel path and finding the closest point on the epicardial surface for each point along the path; and
expanding the multiple projections simultaneously over the surface to form perfusion regions, wherein portions of vessels farther than a threshold distance from the left ventricular epicardial surface are excluded to remove segments not responsible for irrigating the left ventricle, and the model is based on at least one of population and nonuniform rational B-splines ("NURB") and using the patient-specific coronary territory mapping model to determine if medical intervention is needed in the patient.

* * * * *